United States Patent [19]
Cole

[11] 3,843,255
[45] Oct. 22, 1974

[54] FILM SPEED ENHANCEMENT CAMERA

[75] Inventor: Melrose R. Cole, Prides Crossing, Mass.

[73] Assignee: C & C Research, Inc., Danvers, Mass.

[22] Filed: Oct. 23, 1973

[21] Appl. No.: 408,856

Related U.S. Application Data

[62] Division of Ser. No. 272,684, July 17, 1972, Pat. No. 3,823,413.

[52] U.S. Cl................................. 355/68, 354/202
[51] Int. Cl. ........................................... G03b 19/00
[58] Field of Search........................ 355/71, 68, 133

[56] References Cited
UNITED STATES PATENTS
1,840,351   1/1932   Douden ................................ 274/5
1,990,396   2/1935   Ballard................................. 355/68
2,853,921   9/1958   Biedermann.......................... 355/68
3,102,450   9/1963   Grossmann ........................... 355/68

Primary Examiner—John M. Horan
Attorney, Agent, or Firm—Weingarten, Maxham & Schurgin

[57] ABSTRACT

A camera having a controlled internal light source for enhancing the speed and sensitivity of the film therein at the time of exposure. The light is below the level necessary for visual fogging but decreases the amount of image photons required to reach the threshold density of the film.

10 Claims, 5 Drawing Figures

PATENTED OCT 22 1974　　　　　　　　　　　　　　　3,843,255

FILM SPEED ENHANCEMENT CAMERA

This is a division of application Ser. No. 272,684, filed July 17, 1972, Pat. No. 3,823,413.

FIELD OF THE INVENTION

This invention relates to photography and more specifically concerns a camera having an internal light source positioned in front of the film for providing speed enhancement of the film simultaneously with exposure while at the same time preserving the inherent image quality of the film.

DISCUSSION OF THE PRIOR ART

It is well known that photographic films have definite predetermined sensitivities, often referred to as ASA speed values. Films which are designed for some purposes are much more sensitive than others. However, every film has its characteristic threshold of exposure value which must be reached before any image will appear on the film when it is developed. More specifically, a certain level of radiant energy (normally photons of light) must impinge upon the film in order to energize grains of silver halide sufficiently so that they are reduced to metallic silver upon development in order to obtain a visible exposure. Standard characteristic curves, density plotted against the logarithm of the exposure, indicate that for most films, after the threshold level of exposure is reached a substantial increase in exposure is normally necessary before any significant increase in density is observed. This means that objects cannot normally be distinguished on a film within this region of the curve.

It has been attempted through chemical means to increase the speed of film and this has been successful to a certain limited degree. Since the differences between films having speeds of ASA 10 and those having speeds of ASA 1000 are primarily chemical in nature, it is to be expected that appropriate well known additional chemical treatment may enhance these speeds to some limited degree. However, these methods are short term and somewhat uncontrolled while at the same time cause adverse chemical reactions which may make the film discolor or fade at some later time. These methods also tend to reduce the image quality as compared to the normally exposed and processed film. Attempts also have been made to increase the effective speed of film through physical means such as by admitting light from the subject being photographed to impinge upon the film; this light does not pass through the lens. Such a means is described in U.S. Pat. No. 3,577,898 wherein light is admitted through openings or by means of fiber optics located in positions around the periphery of the lens.

The disadvantages of the chemical enhancement has already been pointed out. The physical method using ambient light emanating from the subject also has significant disadvantages. Ambient light admitted to the camera in this fashion floods the film and is uncontrolled. If the light available is low the ambient light is also low. It may thus be seen that the supplemental exposure so provided is quite indefinite when such physical means are used.

SUMMARY OF THE INVENTION

Broadly speaking, this invention comprises a controlled light source within the camera which provides supplemental light to the film simultaneously with the primary exposure. In this manner, the speed of the film is significantly increased so that minimal light which would otherwise be too low to cause an image to be formed on the film will be able to provide a visible exposure. This method of providing controlled supplemental light permits a decrease in the amount of image photons required to reach the threshold density of the film and may be termed "concurrent photon amplification" or CPA. The resulting increase in film speed is attained with no loss in image quality.

Through the means disclosed herein it has been demonstrated that by adding an amount of non-image light which is just below the threshold level of the film but concurrent with the image exposure, the total combined amount of CPA and image light now enables one to obtain an image that was previously unattainable.

Several different means may be used for providing this CPA light, such as the use of one or more controllable light sources, such as small incandescent bulbs or light emitting diodes, or other visible or invisible light sources. These are arranged in convenient locations between the lens and the film. Another method is to use a light source together with a light transmitting fiber having one side formed to diffuse the light toward the film. Alternatively a fiber optic bundle may be used with the tips of the bundle arranged in a suitable fashion to direct the light toward the film. While this invention is particularly adaptable to focal plane shuttered cameras, it is by no means limited to them and other shutter mechanisms or camera arrangements may be accommodated.

This disclosure generally refers to CPA as "light" but the invention would work equally well with other electromagnetic radiations which provide the desired film excitation.

BRIEF DESCRIPTION OF THE DRAWING

The advantages, features and objects of this invention will become more readily apparent from the following detailed description taken in conjunction with the accompanying drawing wherein.

DESCRIPTION OF THE PREFERRED EMBODIMENTS

Figure 1:
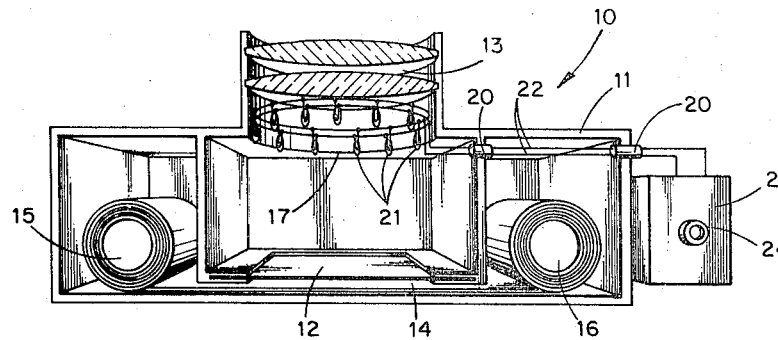
FIG. 1 is a schematic sectional view of a focal plane shutter camera constructed in accordance with this invention.

With reference now to the drawing and more particularly to FIG. 1 thereof there is shown a camera 10 having a light restrictive housing 11, a focal plane shutter 12, a lens assembly 13, and a film 14 with supply and take-up spools 15 and 16. The drawing only indicates the essential features of the camera in schematic fashion and is not intended to show the details of a working device. This camera operates in the normal manner whereby shutter 12 provides a slit which moves across the film for even exposure thereof. The shutter is normally closed so that no light is admitted to the surface of the film.

Figure 3:
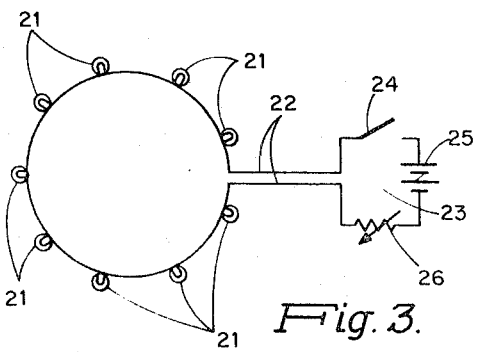
FIG. 3 is a plan view of a light enhancement structure and schematic of the circuit of the invention similar to that shown in FIG. 1.

This type of camera readily permits the lens to be removed and replaced, and provides easy access to the interior of the camera for mounting the light means of this invention. Between lens 13 and shutter 12 is provided light source 17 comprising a plurality of small incandescent bulbs 21, sometimes termed "pin" or "grain-of-wheat" bulbs, connected electrically through means of wires 22 to power supply 23. Tubes 20 are typical feed-through devices which may be used. This structure is shown schematically in FIG. 3 wherein power supply 23 comprises switch 24 and battery 25. The bulbs may be connected in parallel as shown in FIG. 1 or in series as shown in FIG. 3. Switch 24 is shown externally in FIG. 1 as a push button but it may be any desired type of switch. The power supply may be included within the camera, attached externally or it may be entirely separate from the housing with appropriate electrical connection to the light assembly.

Just prior to exposing the film, switch 24 is closed to energize bulbs 21. This creates a low level of light within the camera but the film is not exposed to this light since shutter 12 remains closed. When the picture is taken and shutter 12 opens, the light rays from the subject are focused onto the film through lens assembly 13 and at the same time the low level light from light source 17 also impinges upon the film. The photons of light provided by internal light source are sufficient to, in effect, enable the film so that the additional light provided by the subject, even though it may be at a very low level, will provide a detectable image.

In order to provide complete control of the light level provided by bulbs 21, a rheostat 26 may be included in the circuit. Thus, it is possible to use a relatively wide range of light intensity for the concurrent photon amplification provided by the light source and the light level may be preset just prior to exposure, depending upon the conditions at the time. It is recognized that if the light level of the light source is reduced to a certain point the light which they provide could change spectrally wherein an appropriate filter should be inserted between the bulbs and the shutter. This could be provided in many different ways but the specific structure is not important to the invention here.

Figure 2:
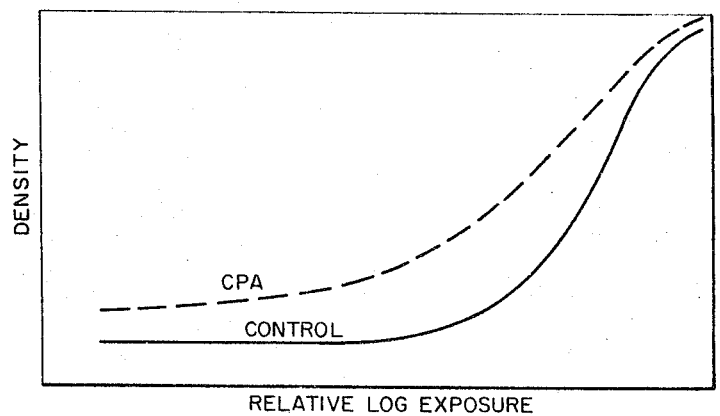
FIG. 2 is a typical characteristic curve showing both the control and the amplified curve for a particular film.

With reference now to FIG. 2 it may be seen how the film density is increased with respect to the logarithm of exposure by concurrent photon amplification (CPA) as provided by this invention. The solid line labelled "CONTROL" is the normal characteristic curve for a particular film and it may be seen that from the threshold level at the left end of the line a relatively large increase in exposure is required before any change in density occurs. Where the curve is nearly horizontal, it is not possible to produce distinguishable exposures. On the other hand the broken line labelled "CPA" shows that with the internal light provided by bulbs 21 substantially any change in exposure will cause a measurable increase in density thereby permitting objects to be distinguished on the film with the same exposure which previously would not create any useful image. Starting at the origin of the CPA line at the left, it may be seen that the line slopes upward and is not substantially horizontal as is the CONTROL line. The speed of the film is thus significantly increased. It may be appreciated that this invention substantially increases exposure latitude and creates a gradient which opens an entire range of the characteristic curve which without CPA is normally of minimal or no use.

While the internal light source may be energized prior to exposure, it is noted that with the type of camera shown, the film is not exposed to the additional light until the shutter is opened and the main exposure is made. The additional light photons thereby impinge upon the film simultaneously with light from the object being photographed, thus allowing a minimal amount of light from the subject to provide a developable image. It is assumed that without the added internal light, the "minimal" light from the subject would be insufficient to create an image.

It has been found that if the additional light is provided to the film before the main exposure, the desired amplification effect is reduced. This is primarily because when light photons impinge upon the film, free electrons are generated within the silver halide. The higher level of energy thus created dies out quite rapidly, the time normally ranging between one microsecond to one second. Likewise it has been found that adding the internal light after the main exposure is not as satisfactory as if it were done simultaneously. Thus for these and practical reasons relating to the physical structure and operation of the camera, it is preferable that the internal light be added simultaneously with the main exposure.

Figure 4:
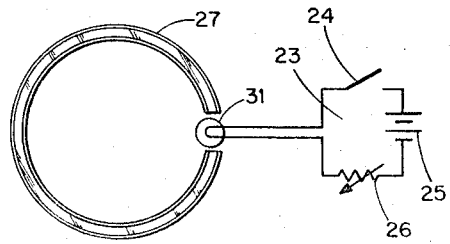
FIG. 4 is an alternative embodiment of the light enhancement structure of FIG. 3.

FIG. 4 shows a single fiber optic rod 27 formed in a circle and subjected at its ends to light from bulb 31 connected in circuit 23. The side of the rod facing rearwardly toward the film may be treated by some method such as grinding to cause the light supplied by bulb 21 to diffuse toward the film.

Figure 5:
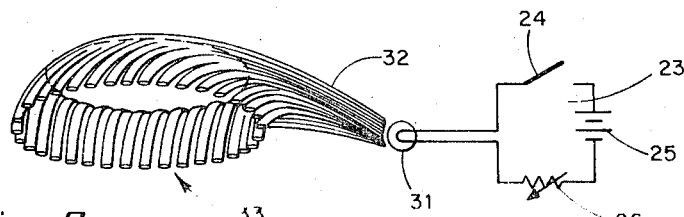
FIG. 5 is another alternative embodiment of the light enhancement structure of FIG. 3.

FIG. 5 shows another alternative embodiment whereby bulb 31 supplies light to a fiber optic bundle 32. This bundle of fibers is split up and spread around in a circle 33 with the fiber ends directed rearwardly toward the film, thereby providing light to the film for the purposes of this invention. All of the light source examples shown are arranged in a circle but such a configuration is not necessary and any arrangement which fits within the confines of the camera and provides the light to the film is satisfactory.

Certain data has been gathered with regard to different films and developers using the structure of this invention as described above. The following are examples of this data. Example No. 1: Eastman Kodak Tri-X-Pan film developed with D-76 developer. Using an exposure time of 1/200 of a second in a camera with an f/4.7 aperture and a 15 volt clear bulb energized at 8.2 volts for amplification, the film speed was increased from ASA 400 to ASA 1,000. Example No. 2: Eastman Kodak High Speed Infrared No. 2481 film developed with D-19 developer. Using a Wratten 89B filter and an exposure time of 1/150 of a second in a camera with an f/5.6 aperture and a 15 volt clear bulb energized at 6.5 volts 193 15 the film speed increased from ASA 40 to ASA 125. With the same film, camera and filter set-up but with the CPA light source changed to a 15 volt green bulb energized at 8.2 volts, the film speed was increased from ASA 40 to ASA 160. Example No. 3: Eastman Kodak Panatomic-X film developed with D-76 developer. Using an exposure time of 1/40 of a second and a 15 volt clear bulb energized at 9.8 volts, the film speed changed from ASA 32 to ASA 64. Example No. 4: Eastman Kodak No. 2475 Recording film developed with DK-50 developer. Using an exposure time of 1/800 of a second in a camera with an f/8 aperture and a 15 volt clear bulb energized at 7.8 volts, the film speed changed from ASA 1000 to ASA 3200. Using the same film and the camera setting but with a 15 volt red bulb energized at 4.5 volts the film speed increased from ASA 1000 to ASA 4000. Tests with Eastman Kodak Kodacolor X also showed marked increases in film speed. The CPA light source will normally be spaced from the film by one to two inches but light intensity may be varied as necessary to permit such distances to be widely variable.

From the above examples it may be seen that a significant improvement in film speed is provided by this invention. The scope of these examples is sufficient to show that the invention operates as desired to provide results which permit photography in light which is otherwise too dim to create an image on film. They also show that enhancement is provided for color film as well as for black and white film. It may thus be appreciated that by using this invention, photographs may be made without additional light such as flash bulbs, photoflood bulbs and strobe lights, in normal room illumination or even under somewhat darker conditions.

The embodiment and variations specifically described above concern the invention as applied to a focal plane shutter camera, but it is readily apparent that this same invention can be used with any type of camera including still and movie cameras, stereo, space and graphic arts cameras and cameras used for special effects such as panoramic and wide screen movie photography. The primary requirement is that the additional light be applied to the film substantially concurrently with exposure to the subject. If a camera is used which has a shutter within the lens assembly, concurrent photon amplification may be provided with a second shutter between the light source and the film which is synchronized with the main camera shutter. Alternatively, a switch which is synchronized to the camera shutter may be provided to energize the light source at the same time that the picture is being taken. This invention could be especially advantageous for use in aerial cameras which have no shutter at all. These cameras time the film speed proportional to the speed of the aircraft so that the exposure aperture is constantly open. When available light is very low, CPA could make the difference between valuable photographs and a wasted trip.

The light source envisioned as useful for this invention is not limited to incandescent bulbs or any particular wavelength of electromagnetic emission. Nor is the type of film to which this invention may be applied limited in any way. Benefits from CPA may be derived by color and black and white films, negative or positive, movie or still, continuous time or graphic arts, astronomical, visible, ultraviolet, X-ray, radiographic, recording, infrared and films used in aerial and space photography. Further, even though it has been stressed that CPA is particularly useful where the light from the subject is minimal, it has other more far ranging uses. It may be used where light is sufficient for a photograph but not sufficient for a fast shutter speed for stop-action photography or other special effects which may be desired.

The broad application of concurrent photon amplification to photography and films in particular can be readily appreciated in view of the above description. It is likely that modifications and improvements will now occur to those skilled in the art which are within the scope of this invention.

What is claimed is:

1. An improved camera comprising:
   a light restrictive housing;
   means for retaining photographic film within said housing adjacent one side thereof for recording an original image of a subject resulting from exposure of said photographic film to image light from said subject;
   optical means mounted in another side of said housing for focusing an image of a subject on the plane of said film;
   an independently energized, non-image source for providing light to the phtotsensitive surface of said film, said non-image source comprising;
   a light emitting element; and
   a light pipe within said housing for transmitting light from said light emitting element to a location in front of said film in a dispersed pattern to evenly expose said film to said non-image light; and
   means within said housing for subjecting said film to non-image light from said source substantially simultaneously with the exposure of said film to image light from the subject being photographed thereby enhancing the speed of said film while preserving its inherent image quality.

2. The camera recited in claim 1 wherein said light source comprises a lamp and a light transmitting rod, said rod being formed in a circle between said lens assembly and said film and having a light diffusing surface directing light toward said film.

3. The camera recited in claim 1 wherein said light source comprises a lamp and a fiber optic bundle, said bundle having the fiber ends opposite said bulb arranged in a circle between said film and said lens assembly, directing light toward said film.

4. The camera recited in claim 1 wherein said light emitting element comprises a light emitting diode and said light pipe comprises a light transmitting rod, said rod being formed in a circle between said focusing means and said film and having a light diffusing surface directing light toward said film.

5. The camera recited in claim 1 wherein said light emitting element comprises a light emitting diode and said light pipe comprises a fiber optic bundle, said bundle having the fiber ends opposite said light emitting diode arranged in a circle between said film and said focusing means, directing light toward said film.

6. The camera recited in claim 1 wherein said means for subjecting said film to said source of non-image light comprises shutter means within said camera.

7. The camera recited in claim 1 and further comprising means for controlling the duration of non-image light exposure to said film independently of the means for exposing said film to said image light, providing that said film is exposed to said image light and said non-image light simultaneously.

8. The camera recited in claim 1 wherein said means for subjecting said film to light comprises a first shutter for exposing said film to image light and a second shutter for exposing said film to non-image light.

9. The camera recited in claim 8 wherein said first shutter is located within said lens assembly and said second shutter is located between said light source and said film.

10. The camera recited in claim 1 wherein said means for subjecting said film to light comprises a focal plane shutter.

* * * * *